(12) United States Patent
Han et al.

(10) Patent No.: US 11,845,492 B2
(45) Date of Patent: Dec. 19, 2023

(54) VEHICLE BODY STRUCTURE

(71) Applicants: HYUNDAI MOTOR COMPANY, Seoul (KR); KIA MOTORS CORPORATION, Seoul (KR)

(72) Inventors: Seung Woo Han, Hwaseong-si (KR); Chang Sup Hwang, Seongnam-si (KR); Yu Jeong Kim, Yongin-si (KR); Kyung Hoon Son, Suwon-si (KR); Dae Myoung Park, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 318 days.

(21) Appl. No.: 17/190,264

(22) Filed: Mar. 2, 2021

(65) Prior Publication Data
US 2022/0111902 A1 Apr. 14, 2022

(30) Foreign Application Priority Data
Oct. 13, 2020 (KR) .......................... 10-2020-0132074

(51) Int. Cl.
| | |
|---|---|
| *B62D 25/20* | (2006.01) |
| *B62D 21/15* | (2006.01) |
| *B62D 27/00* | (2006.01) |
| *B60K 1/04* | (2019.01) |

(52) U.S. Cl.
CPC .............. *B62D 21/155* (2013.01); *B60K 1/04* (2013.01); *B62D 25/2018* (2013.01); *B62D 25/2027* (2013.01); *B62D 25/2036* (2013.01); *B62D 27/00* (2013.01); *B60K 2001/0438* (2013.01); *B60Y 2306/01* (2013.01)

(58) Field of Classification Search
CPC .... B62D 21/15; B62D 21/155; B62D 21/157; B62D 25/20; B62D 25/2018; B62D 25/2027; B62D 25/2036; B62D 27/00; B60K 1/04; B60K 2001/0422; B60K 2001/0438; B60Y 2306/01
See application file for complete search history.

(56) References Cited

U.S. PATENT DOCUMENTS

| | | | |
|---|---|---|---|
| RE44,994 E | 7/2014 | Rawlinson et al. | |
| 9,033,085 B1 * | 5/2015 | Rawlinson | B60K 1/04 180/68.5 |
| 10,293,861 B2 * | 5/2019 | Jeong | B62D 21/157 |
| 10,668,957 B2 * | 6/2020 | Choi | B62D 25/2036 |
| 11,034,248 B2 * | 6/2021 | Ohkuma | B62D 25/20 |
| 11,285,796 B2 * | 3/2022 | Choi | B62D 21/155 |

(Continued)

FOREIGN PATENT DOCUMENTS

| | | | | |
|---|---|---|---|---|
| CN | 109204513 A | * | 1/2019 | ............... B60K 1/04 |
| CN | 109204536 A | * | 1/2019 | ........... B62D 21/157 |

(Continued)

*Primary Examiner* — Barry Gooden, Jr.
(74) *Attorney, Agent, or Firm* — LEMPIA SUMMERFIELD KATZ LLC

(57) ABSTRACT

A vehicle body structure for safely protecting a high-voltage, the vehicle body structure including: a battery mounted on bottom portions of a center floor and a rear floor; and a protective structure having a bottom portion on which a peripheral portion of the battery is mounted and including panels fitted to each other into a shape covering a peripheral portion of the center floor.

12 Claims, 15 Drawing Sheets

(56) References Cited

U.S. PATENT DOCUMENTS

| | | | | |
|---|---|---|---|---|
| 11,351,890 B2* | 6/2022 | Park | ............ | B60N 2/005 |
| 11,400,986 B2* | 8/2022 | Jeong | ............ | B62D 25/025 |
| 11,498,620 B2* | 11/2022 | Hwang | ............ | B62D 21/157 |
| 11,511,612 B2* | 11/2022 | Jeon | ............ | B62D 25/20 |
| 11,524,606 B2* | 12/2022 | Lee | ............ | B62D 25/2036 |
| 11,597,447 B2* | 3/2023 | Kim | ............ | B62D 21/152 |
| 2012/0153675 A1* | 6/2012 | Rawlinson | ............ | B62D 25/025 |
| | | | | 296/193.06 |
| 2012/0153682 A1* | 6/2012 | Rawlinson | ............ | B60J 10/85 |
| | | | | 296/209 |
| 2012/0160583 A1* | 6/2012 | Rawlinson | ............ | B62D 29/008 |
| | | | | 903/952 |
| 2012/0161429 A1* | 6/2012 | Rawlinson | ............ | B62D 25/025 |
| | | | | 280/801.1 |
| 2012/0161472 A1* | 6/2012 | Rawlinson | ............ | B60R 16/04 |
| | | | | 296/187.08 |
| 2012/0169089 A1* | 7/2012 | Rawlinson | ............ | B62D 25/087 |
| | | | | 296/193.08 |
| 2012/0175916 A1* | 7/2012 | Rawlinson | ............ | B62D 25/20 |
| | | | | 296/203.02 |
| 2013/0088044 A1* | 4/2013 | Charbonneau | ............ | B62D 27/023 |
| | | | | 296/187.12 |
| 2013/0088045 A1* | 4/2013 | Charbonneau | ............ | B62D 25/2036 |
| | | | | 296/187.12 |
| 2013/0153317 A1* | 6/2013 | Rawlinson | ............ | F41H 7/042 |
| | | | | 180/68.5 |
| 2013/0229030 A1* | 9/2013 | Yamaguchi | ............ | B62D 25/20 |
| | | | | 296/193.07 |
| 2014/0182958 A1* | 7/2014 | Rawlinson | ............ | B60L 50/66 |
| | | | | 180/68.5 |
| 2015/0135939 A1* | 5/2015 | Rawlinson | ............ | F41H 5/04 |
| | | | | 89/36.08 |
| 2016/0093931 A1* | 3/2016 | Rawlinson | ............ | H01M 50/209 |
| | | | | 429/72 |
| 2017/0229746 A1* | 8/2017 | Rawlinson | ............ | H01M 10/643 |
| 2017/0229748 A1* | 8/2017 | Rawlinson | ............ | H01M 10/653 |
| 2018/0134320 A1* | 5/2018 | Jeong | ............ | B62D 21/157 |
| 2018/0134324 A1* | 5/2018 | Son | ............ | H01M 50/202 |
| 2019/0023321 A1* | 1/2019 | Ayukawa | ............ | B62D 21/03 |
| 2019/0210659 A1* | 7/2019 | Choi | ............ | B60K 1/04 |
| 2020/0282816 A1* | 9/2020 | Matsuda | ............ | B60K 1/04 |
| 2021/0078642 A1* | 3/2021 | Grattan | ............ | B62D 25/04 |
| 2022/0041219 A1* | 2/2022 | Son | ............ | B62D 21/157 |
| 2022/0111904 A1* | 4/2022 | Hwang | ............ | B60K 1/04 |
| 2022/0144060 A1* | 5/2022 | Shin | ............ | H01M 50/249 |
| 2022/0153111 A1* | 5/2022 | Tatsuwaki | ............ | B60K 1/04 |
| 2022/0153112 A1* | 5/2022 | Tatsuwaki | ............ | H01M 50/188 |
| 2022/0161855 A1* | 5/2022 | Tatsuwaki | ............ | B60K 1/04 |
| 2022/0161867 A1* | 5/2022 | Choi | ............ | B62D 25/2036 |
| 2022/0227215 A1* | 7/2022 | Ishizaki | ............ | B60L 58/26 |
| 2022/0410973 A1* | 12/2022 | Kim | ............ | B62D 21/15 |
| 2023/0056309 A1* | 2/2023 | Han | ............ | B62D 21/155 |
| 2023/0173905 A1* | 6/2023 | Eberle | ............ | B60K 1/04 |
| | | | | 296/187.08 |
| 2023/0223635 A1* | 7/2023 | Jeong | ............ | H01M 50/262 |
| | | | | 429/99 |

FOREIGN PATENT DOCUMENTS

| | | | | |
|---|---|---|---|---|
| CN | 111114652 A * | 5/2020 | | |
| DE | 102016013633 A1 * | 5/2018 | ............ | B60K 1/04 |
| DE | 102018105371 A1 * | 9/2018 | ............ | B60K 1/04 |
| DE | 102018115211 A1 * | 12/2018 | ............ | B60K 1/04 |
| KR | 10-2019-0021167 | 3/2019 | | |
| WO | WO-2019001531 A1 * | 1/2019 | ............ | B60K 1/00 |
| WO | WO-2020105282 A1 * | 5/2020 | | |

* cited by examiner

VEHICLE BODY STRUCTURE

CROSS REFERENCE TO RELATED APPLICATION

The present application claims priority to and the benefit of Korean Patent Application No. 10-2020-0132074, filed on Oct. 13, 2020, the entire contents of which are incorporated herein by reference.

FIELD

The present disclosure generally relates to a vehicle body structure for safely protecting a high-voltage battery.

BACKGROUND

The statements in this section merely provide background information related to the present disclosure and may not constitute prior art.

The global electric vehicle market has been rapidly growing over time and the increment of such growth has also been accelerated over time, such that the consumption of electric vehicles has been increased.

In electric vehicles that have been developed recently, a high-voltage battery, the size of which is increased to increase the driving range of an electric vehicle, is located on the underside of the floor. There have been significant structural changes compared to early-stage electric vehicles in which a high-voltage battery is mounted on the underside of the rear floor for compliance with internal combustion engines.

In this manner, an electric vehicle is provided with a high-voltage battery instead of a fuel tank. When the high-voltage battery is fractured by a collision, a fire may occur.

In particular, in a vehicle in which the high-voltage battery having the increased size for increasing the driving range of an electric vehicle is disposed in the length direction on the underside of the floor of the vehicle body, the structure may be vulnerable to a side pole collision.

The foregoing is intended merely to aid in the understanding of the background of the present disclosure, and is not intended to mean that the present disclosure falls within the purview of the related art that is already known to those skilled in the art.

SUMMARY

The present disclosure provides a vehicle body structure for safely protecting a high-voltage battery.

According to one form of the present disclosure, a vehicle body structure includes: a battery mounted on bottom portions of a center floor and a rear floor; and a protective structure having a bottom portion on which a peripheral portion of the battery is mounted, and including panels fitted to each other into a shape covering a peripheral portion of the center floor, thereby protecting the battery from external impact.

The protective structure may include: a front complex coupled to, while covering, a front end of the center floor and portions of both side surfaces of the center floor; a rear complex coupled to, while covering, a rear end of the center floor and remaining portions of the both side surfaces of the center floor; and side complexes located on both sides of the center floor and coupled to an inner portion of the rear complex.

The front complex may include: a center floor cover panel having a shape covering a power relay of the battery; side-seal front panels coupled to portions of front ends of the both side surfaces of the center floor in a longitudinal direction; and center floor cross members coupled to and between the cover panel and the side-seal front panels in a transverse direction.

The center floor cover panel may be configured such that both side portions thereof are coupled to the center floor cross members and a central portion thereof protrudes upward while covering the power relay.

A first end of each of the center floor cross members and a corresponding side surface of the center floor cover panel may be joined to each other while overlapping each other in a top-bottom direction. A second end of the each of the center floor cross members may be supported and joined to a side surface of a corresponding side-seal front panel of the side-seal front panels.

The rear complex may include: side-seal rear panels coupled to portions of rear ends of the both side surfaces of the center floor and portions of both side surfaces of the rear floor in a longitudinal direction; a rear floor extension coupled to joining portions of the center floor and the rear floor in a transverse direction, with both ends thereof being fixed to the side-seal rear panels; and a rear floor cross member coupled to the rear floor extension and having a shape covering the rear floor extension, with both ends thereof being fixed to the side-seal rear panels.

The rear floor extension may include extension supports extending from the both ends thereof and supported on top surfaces of the side-seal rear panels. The rear floor cross member may include cross member supports extending from both ends thereof and supported on the top surfaces of the side-seal rear panels. The extension supports and the cross member supports may be joined to the top surfaces of the side-seal rear panels while overlapping each other.

The battery may include transverse members coupled in the transverse direction between both side surfaces of the battery. The transverse members, the rear floor extension, and the rear floor cross member may be positioned so as to overlap each other in a top-bottom direction.

Each of the side complexes may include reinforcing panels respectively having a convex-concave structure and extending in the longitudinal direction along side-seal front panels and side-seal rear panels coupled to both side portions of the center floor. Each of the side complexes may be provided by stacking and fixing the reinforcing panels to each other in a top-bottom direction.

First fasteners may be provided to extend through the reinforcing panels, a side front panel, and a side rear panel, from top surfaces of the reinforcing panels to a bottom surface of the side-seal rear panel. Second fasteners may extend through a peripheral portion of the battery to engage with the first fasteners.

The first fasteners may be joined to an upper reinforcing panel among the stacked reinforcing panels.

The side-seal front panels and the side-seal rear panels coupled to the both side portions of the center floor may have guide holes. The battery may have guide pins provided on a peripheral portion thereof. The guide pins may be fitted into the guide holes.

The vehicle body structure may further include seat cross members coupled in a transverse direction between the front end and the rear end of the center floor. The seat cross members may be connected to side-seal panels coupled to the both side portions of the center floor.

Reinforcing members may be connected to the seat cross members and the side-seal panels. The reinforcing members may have a shape extending toward the side-seal panels.

As described above, in a side collision of a vehicle, the present disclosure may distribute a collision load, applied to a side surface of the protective structure, in a plurality of directions, thereby reducing the collision load applied to the battery. Accordingly, the present disclosure may inhibit the battery from being fractured or damaged, thereby safely protecting the battery.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
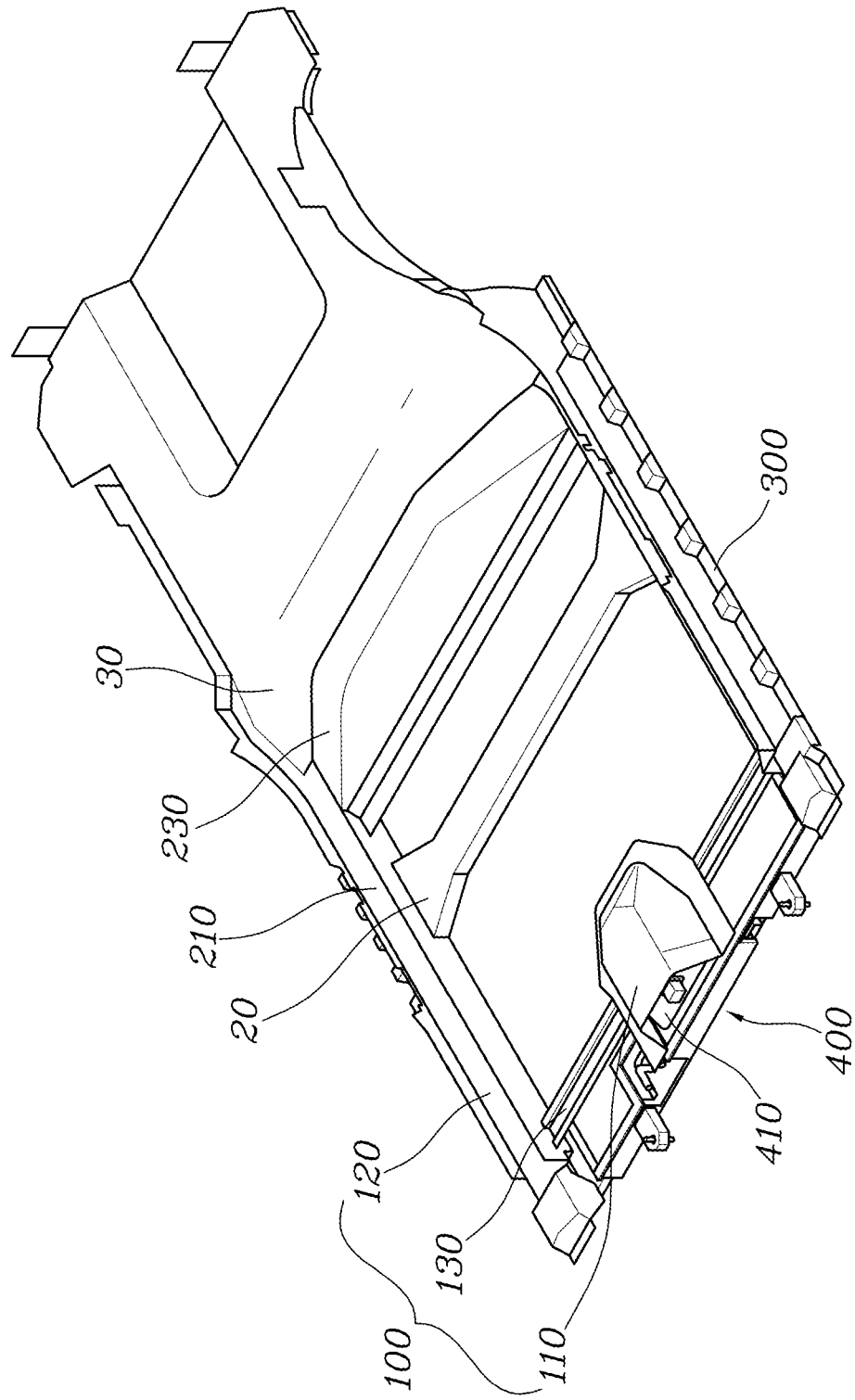
FIG. 1 is a perspective view illustrating a vehicle body structure according to one form of the present disclosure, with a battery being mounted on the bottom portion of the vehicle body structure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 3:
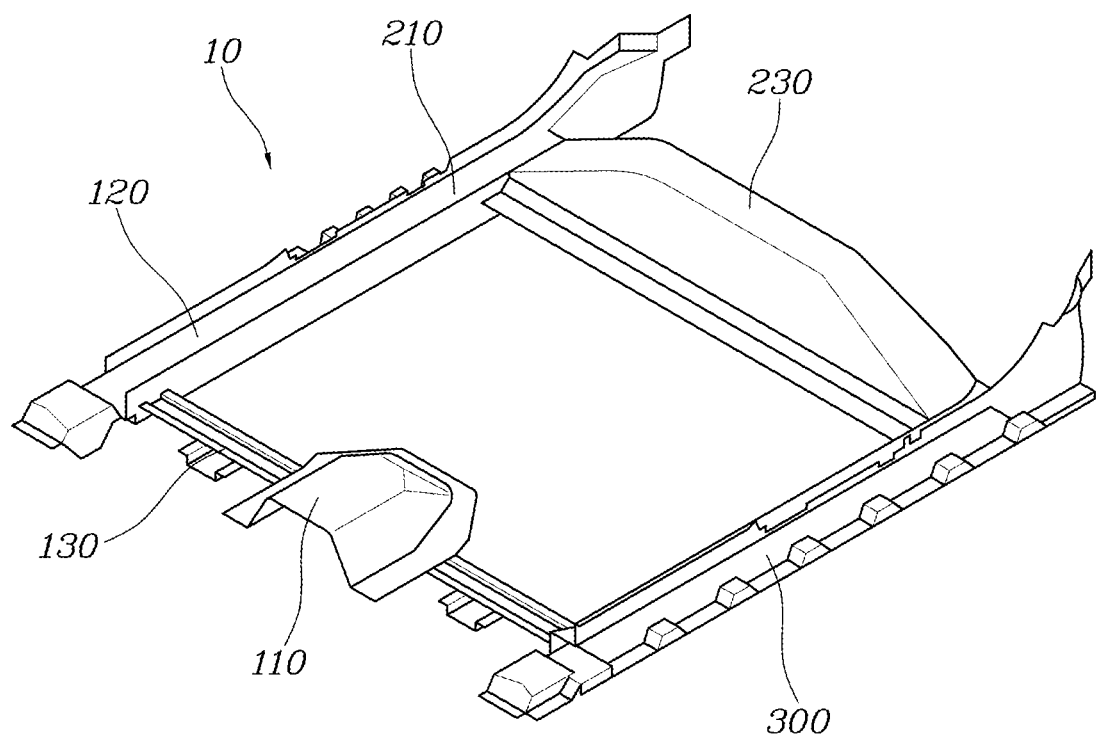
FIG. 3 is a perspective view illustrating a protective structure having a rectangular closed structure according to one form of the present disclosure.

FIG. 1 is a perspective view illustrating a vehicle body structure according to one form of the present disclosure, with a battery 400 being mounted on the bottom portion of the vehicle body structure, and FIG. 3 is a perspective view illustrating a protective structure 10 having a rectangular closed structure according to one form of the present disclosure.

Figure 2:
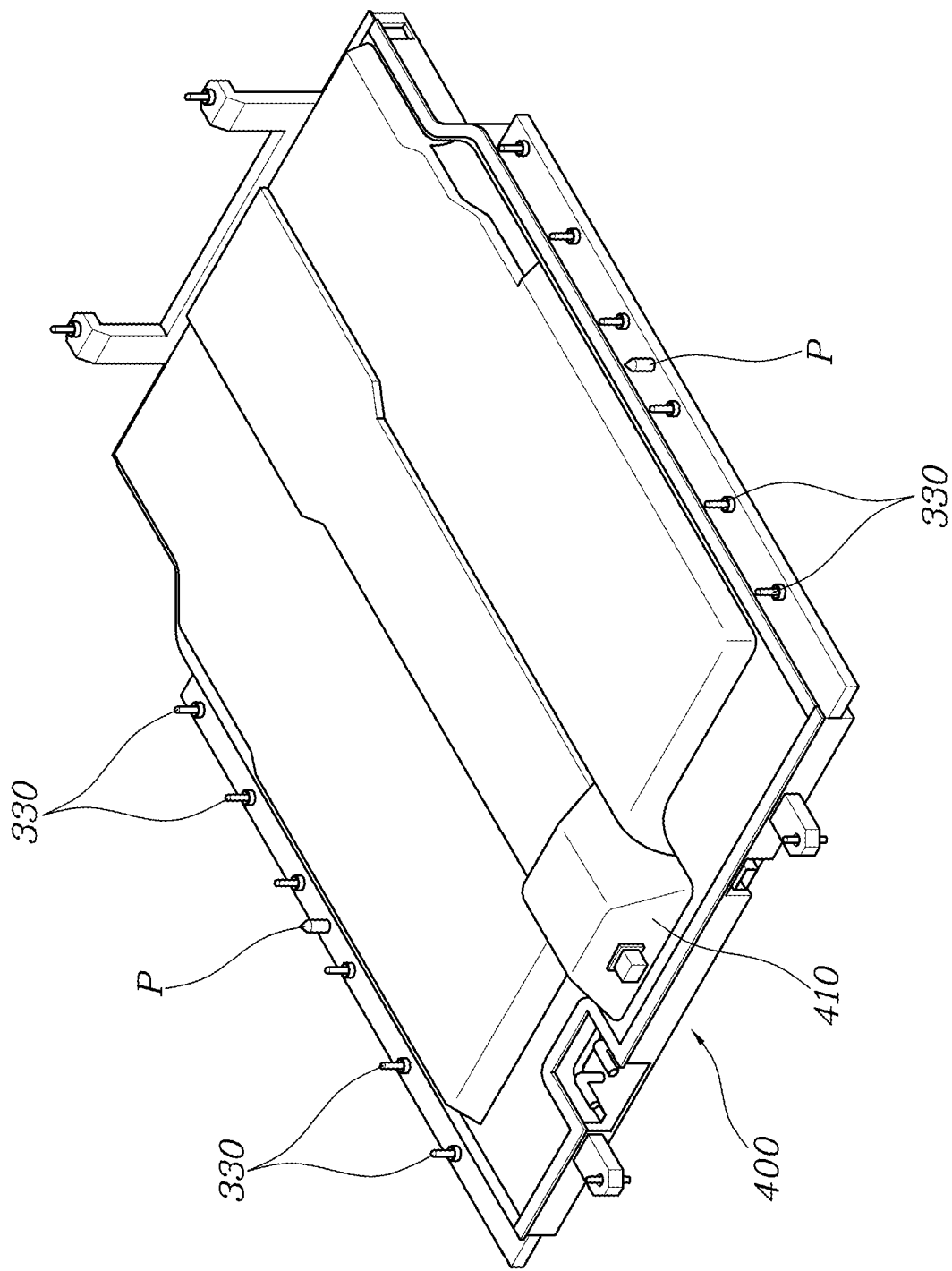
FIG. 2 is a perspective view illustrating the shape of the battery according to one form of the present disclosure.

Referring to FIGS. 1 to 3, the vehicle body structure includes the battery 400 and the protective structure 10. The battery 400 is mounted on the bottom portions of a center floor 20 and a rear floor 30. The peripheral portion of the battery 400 is mounted on the bottom portion of the protective structure 10. The protective structure 10 includes panels fitted to each other into a shape covering the peripheral portions of the center floor 20, thereby protecting the battery 400 from external impact.

For example, the battery 400 is a high-voltage battery 400 (hereinafter, referred to as the "battery") used in an electric vehicle. The battery 400 extends in the longitudinal direction to cover not only the underside of the center floor 20 but also a portion of the underside of the rear floor 30.

In addition, the protective structure 10 has a rectangular structure coupled to the front end of the center floor 20 in the transverse direction, to the rear end of the center floor 20, i.e. joining portions of the center floor 20 and the rear floor 30, and to both side surfaces of the center floor 20.

That is, due to the panel-to-panel coupling between the center floor 20 and the rear floor 30, the entirety of the rectangular protective structure 10 moves together in a side collision.

Accordingly, in a side collision of a vehicle, when a collision load is applied to a side surface of the protective structure 10, the collision load is distributed in the longitudinal direction along the panels of the side surface of the protective structure 10 and the distributed collision load is distributed in the transverse direction along the panels of the front end and the rear end of the protective structure 10, so that the collision load applied to the battery 400 may be reduced. Accordingly, the protective structure 10 may inhibit the battery 400 from being fractured or damaged, thereby safely protecting the battery 400.

Figure 4:
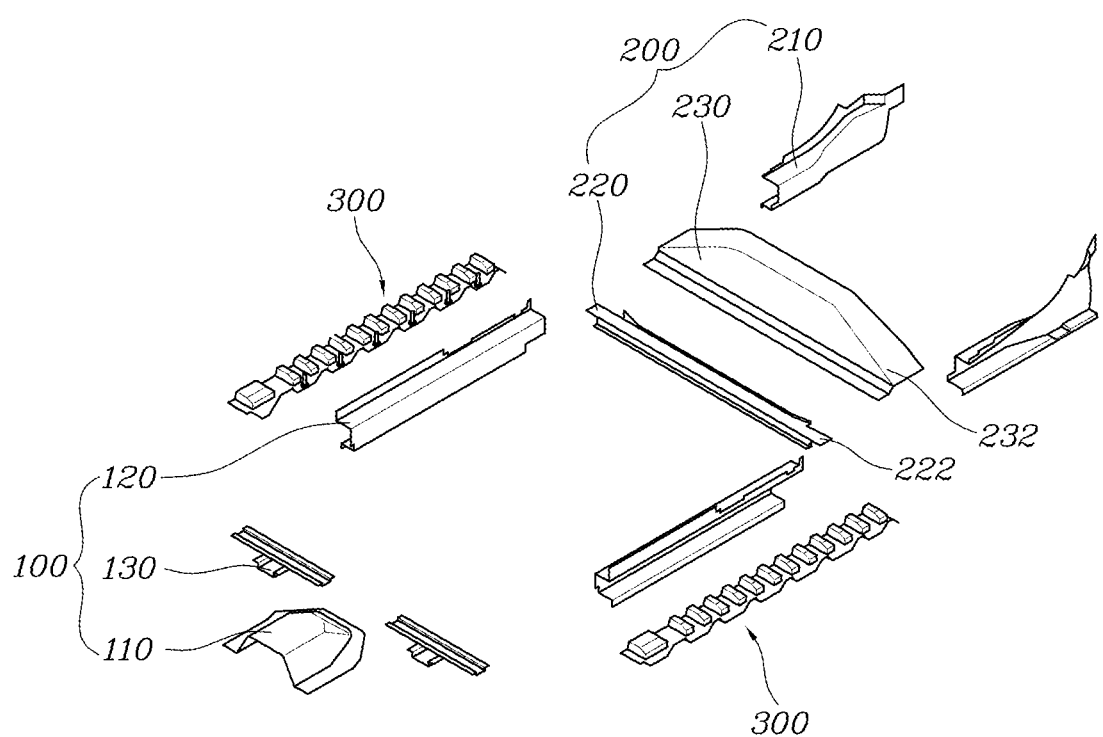
FIG. 4 is an exploded perspective view illustrating components of the protective structure illustrated in FIG. 3.

FIG. 4 is an exploded perspective view illustrating components of the protective structure 10 illustrated in FIG. 3.

Referring to FIGS. 3 and 4, the protective structure 10 includes a front section 100, a rear complex 200, and side complexes 300. The front complex 100 is coupled to, while covering, the front end of the center floor 20 and portions of both side surfaces of the center floor 20. The rear complex 200 is coupled to, while covering, the rear end of the center floor 20 and the remaining portions of the both side surfaces of the center floor 20. The side complexes 300 are located on both sides of the center floor 20 and coupled to inner portions of the rear complex 200. (The term "complex" used herein may refer to a structure comprised of two or more pieces or components connected together.)

For example, the front complex 100 is an assembly comprised of a center floor cover panel 110, side-seal front panels 120, and center floor cross members 130 that are fitted together. The front complex 100 is U-shaped, covering the front end portion and portion of the both side surfaces of the center floor 20.

In addition, the rear complex 200 is an assembly comprised of side-seal rear panels 210, a rear floor extension 220, and a rear floor cross member 230 that are fitted together. The rear complex 200 is H-shaped, covering the rear end portion of the center floor 20, portions of the both side surfaces of the center floor 20, and portions of both side surfaces of the rear floor 30.

In addition, the side complexes 300 are fixed to the inner portions of the side-seal front panels 120 and the side-seal rear panels 210 in the longitudinal direction, and serve to reinforce the strength of side-seals.

That is, the protective structure 10 according to the present disclosure is realized to have the rectangular structure by forming the first, second, and third complexes into modules by combining components and fitting the modules of the complexes together. The protective structure 10 may be easily and simply fixed to the center floor 20 and the rear floor 30. In particular, the protective structure 10 is assembled into a unitary structure such that the entirety of the protective structure 10 moves together when a collision load is input. Consequently, the protective structure 10 may effectively distribute the collision load applied to the battery 400, thereby safely protecting the battery 400.

For reference, each of the side-seal front panels 120 and the side-seal rear panels 210 includes a U-shaped inner member and a U-shaped outer member respectively having an open side surface, the inner member and the outer member being fitted together to define an internal space, such that the side complexes 300 are fixed in the internal spaces. Herein, it should be understood that only the inner members are illustrated but none of the outer members are illustrated, for the sake of brevity, in order to mainly illustrate the fixed state of the side complexes 300.

The configuration of each of the complexes of the protective structure 10 will now be described. First, as illustrated in FIGS. 1 to 4, the front complex 100 includes: the center floor cover panel 110 shaped to cover a power relay 410 of the battery 400; the side-seal front panels 120 coupled to portions of the front ends of the both side surfaces of the center floor 20 in the longitudinal direction; and the center floor cross members 130 coupled between the cover panel and the side-seal front panels 120 in a transverse direction.

For example, the power relay 410 protrudes from the central portion of the front end of the battery 400. The power relay 410 serves to supply power or stop the supply of power from the high-voltage battery to components using a high voltage. The center floor cover panel 110 is coupled to the central portion of the front end of the center floor 20 such that the center floor cover panel 110 may cover the power relay 410.

In addition, a first end of each of the center floor cross members 130 is fixed to a corresponding one of both side portions of the center floor cover panel 110, and a second end of each of the center floor cross members 130 is fixed to a side surface of a corresponding one of the side-seal front panels 120 coupled to both side portions of the center floor 20, such that the front complex 100 is U-shaped.

In addition, the center floor cover panel 110 is configured such that both side portions thereof are coupled to the center floor cross members 130 and the central portion thereof protrudes upward while covering the power relay 410.

For example, the center floor cover panel 110 is formed by hot stamping. The center floor cover panel 110 may be formed into a shape covering the outer surface of the protruding power relay 410. In addition, the strength of the center floor cover panel 110 may be improved due to the characteristic of processing such that the center floor cover panel 110 may firmly support a collision load transferred through the side-seal front panels 120 and the center floor cross members 130, thereby safely protecting the power relay 410 within the center floor cover panel 110.

In addition, the panels of the front complex 100 are fixed to each other by welding the components.

Figure 5:
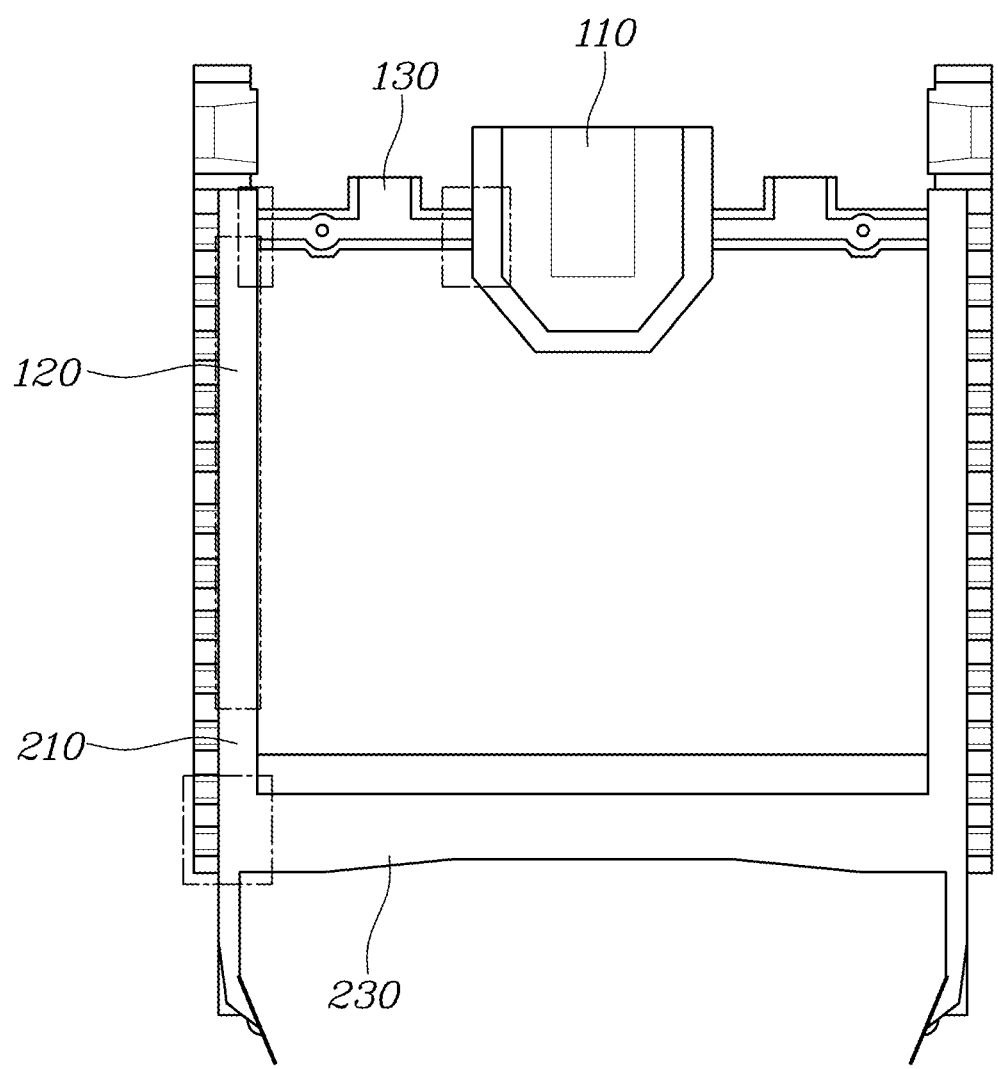
FIG. 5 is a plan view illustrating the protective structure illustrated in FIG. 3.
Figure 6:
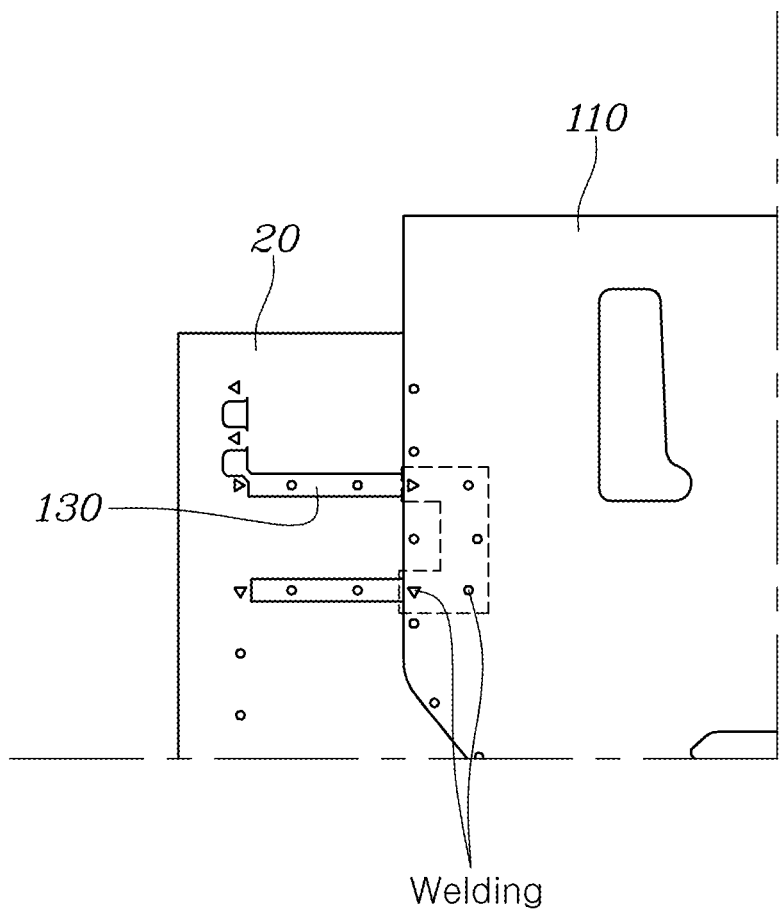
FIG. 6 is a view illustrating a welding operation in the portion "A" in FIG. 5.
Figure 7:
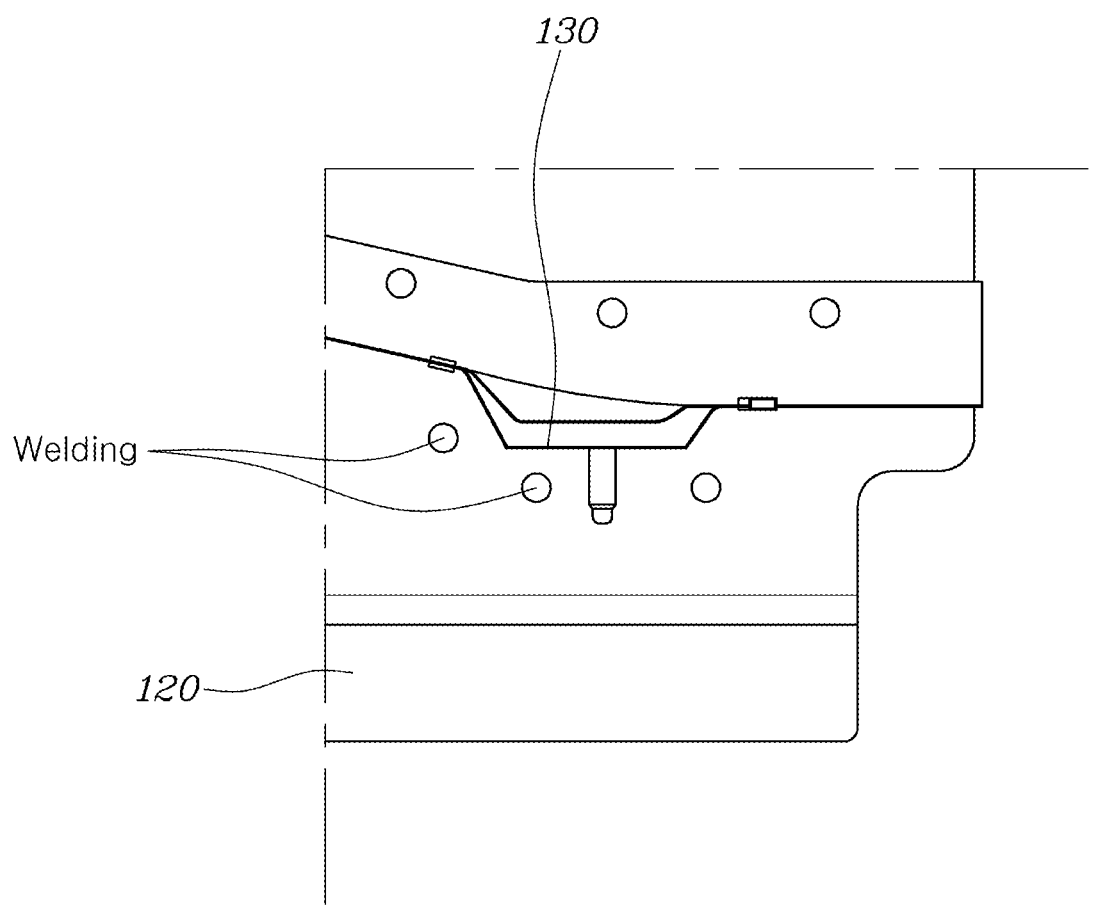
FIG. 7 is a view illustrating a shape viewed from the side in order to illustrate a welding operation in the portion "B" in FIG. 5.

FIG. 5 is a plan view illustrating the protective structure 10 illustrated in FIG. 3, FIG. 6 is a view illustrating a welding operation in the portion "A" in FIG. 5, and FIG. 7 is a view illustrating a shape viewed from the side in order to illustrate a welding operation in the portion "B" in FIG. 5.

Referring to FIGS. 5 to 7, a first end of each of the center floor cross members 130 and the corresponding side surface of the center floor cover panel 110 are welded to each other while overlapping each other in the top-bottom direction, and a second end of the each of the center floor cross members 130 is supported and welded to the side surface of the corresponding side-seal front panel 120.

That is, the front complex 100 may be firmly fixed as a unitary structure by welding the center floor cover panel 110 and the center floor cross members 130 and welding the center floor cross members 130 and the side-seal front panels 120.

Figure 8:
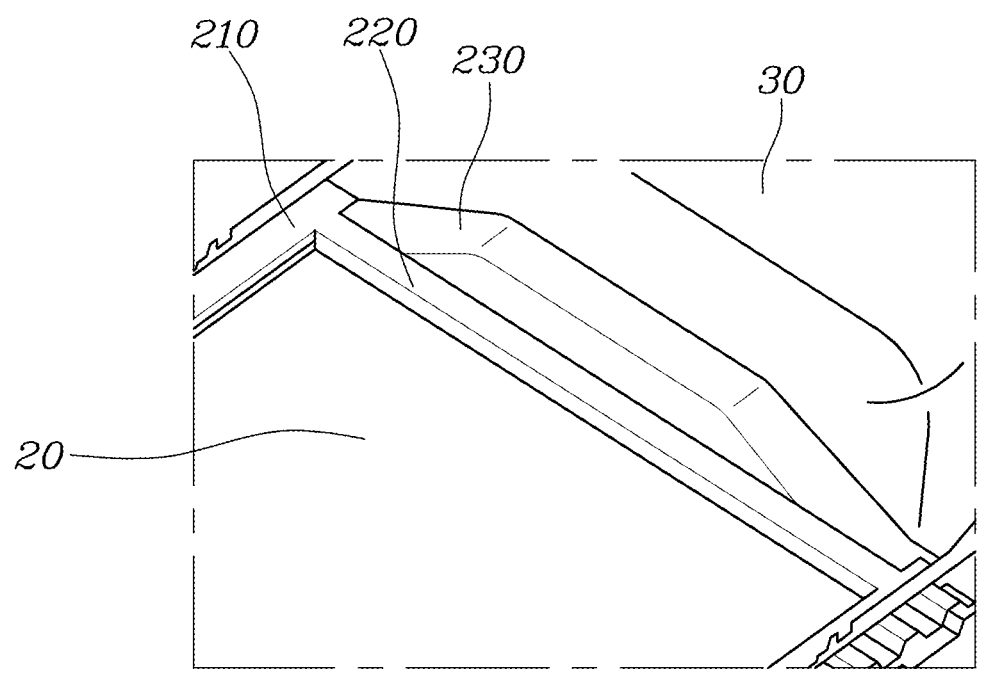
FIG. 8 is a view illustrating a shape in which the rear floor extension is coupled to an inner portion of the rear floor cross member.

FIG. 8 is a view illustrating a shape in which the rear floor extension 220 is coupled to an inner portion of the rear floor cross member 230.

Referring to FIG. 8, the rear complex 200 includes: the side-seal rear panels 210 coupled to portions of the rear ends of the both side surfaces of the center floor 20 and portions of both side surfaces of the rear floor 30 in the longitudinal direction; the rear floor extension 220 coupled to joining portions of the center floor 20 and the rear floor 30 in the transverse direction, with both ends thereof being fixed to the side-seal rear panels 210; and the rear floor cross member 230 coupled to the rear floor extension 220 and having a shape covering the rear floor extension 220, with both ends thereof being fixed to the side-seal rear panels 210.

For example, the rear floor extension 220 is coupled to the joining portions of the center floor 20 and the rear floor 30, and the rear floor cross member 230 is coupled to the rear floor extension 220 and has the shape covering the rear floor extension 220. The rear floor cross member 230 may have a shape inclined upward from both ends toward the middle portion, in which a portion of the middle portion is flat.

In addition, the side-seal rear panels 210 are coupled to both side portions of the center floor 20 and the rear floor 30. Both ends of the rear floor cross member 230 are fixed to side surfaces of the side-seal rear panels 210, respectively. Accordingly, the rear complex 200 is H-shaped.

Furthermore, the panels of the rear complex 200 are fixed to each other by welding the components.

Figure 9:
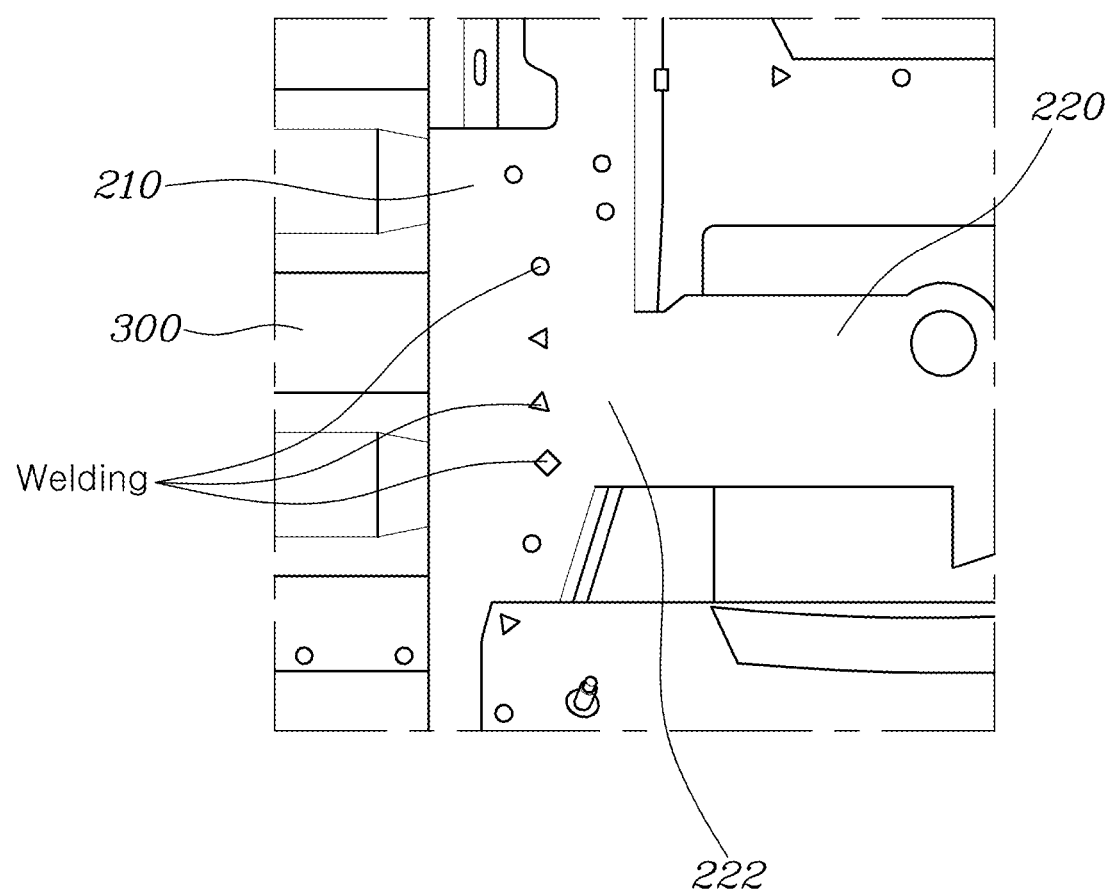
FIG. 9 is a view illustrating a welding operation of the rear floor extension in the portion "C" in FIG. 5.
Figure 10:
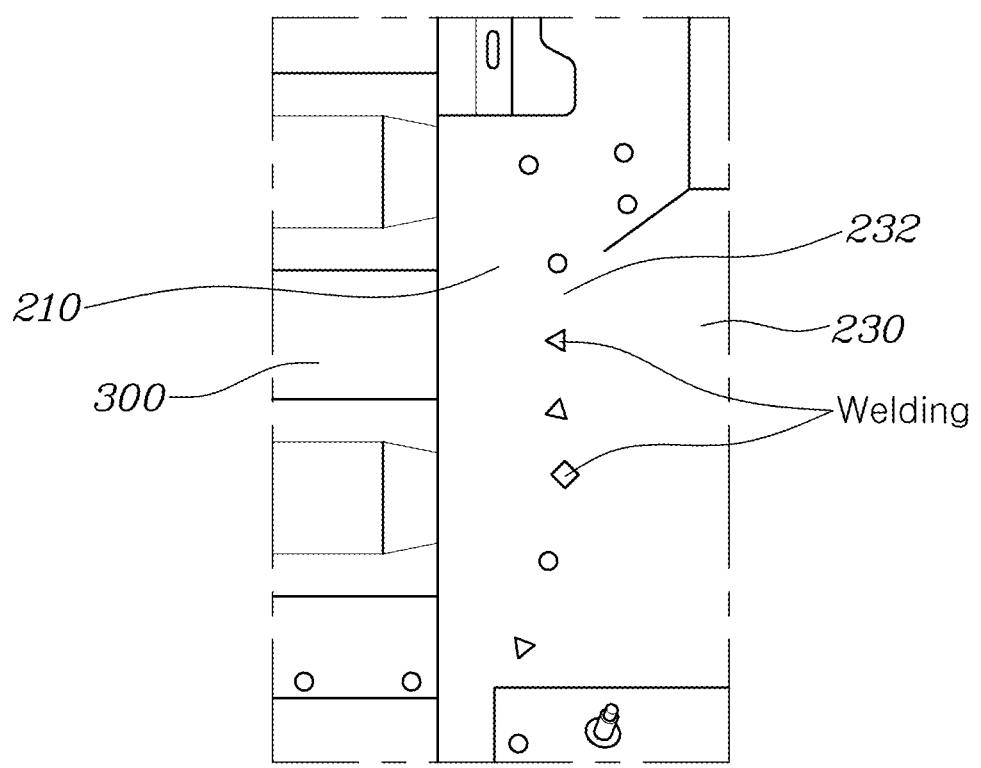
FIG. 10 is a view illustrating a welding operation of the rear floor cross member in the portion "C" in FIG. 5.

FIG. 9 is a view illustrating a welding operation of the rear floor extension 220 in the portion "C" in FIG. 5, and FIG. 10 is a view illustrating a welding operation of the rear floor cross member 230 in the portion "C" in FIG. 5.

Referring to FIGS. 9 and 10, extension supports 222 extend from the both ends of the rear floor extension 220 and are supported on the top surfaces of the side-seal rear panels 210. Cross member supports 232 extend from both ends of the rear floor cross member 230 and are supported on the top surfaces of the side-seal rear panels 210. The extension supports 222 and the cross member supports 232, overlapping each other, are welded to the top surfaces of the side-seal rear panels 210.

That is, the extension supports 222 extend toward the side-seal rear panels 210 and are welded to the top surface of the side-seal rear panels 210. The cross member supports 232 extend upward toward the side-seal rear panels 210 and are also welded to both the top surface of the side-seal rear panels 210 and the top surface of the extension supports 222. Accordingly, the rear complex 200 may be firmly fixed as a unitary structure.

Figure 11:
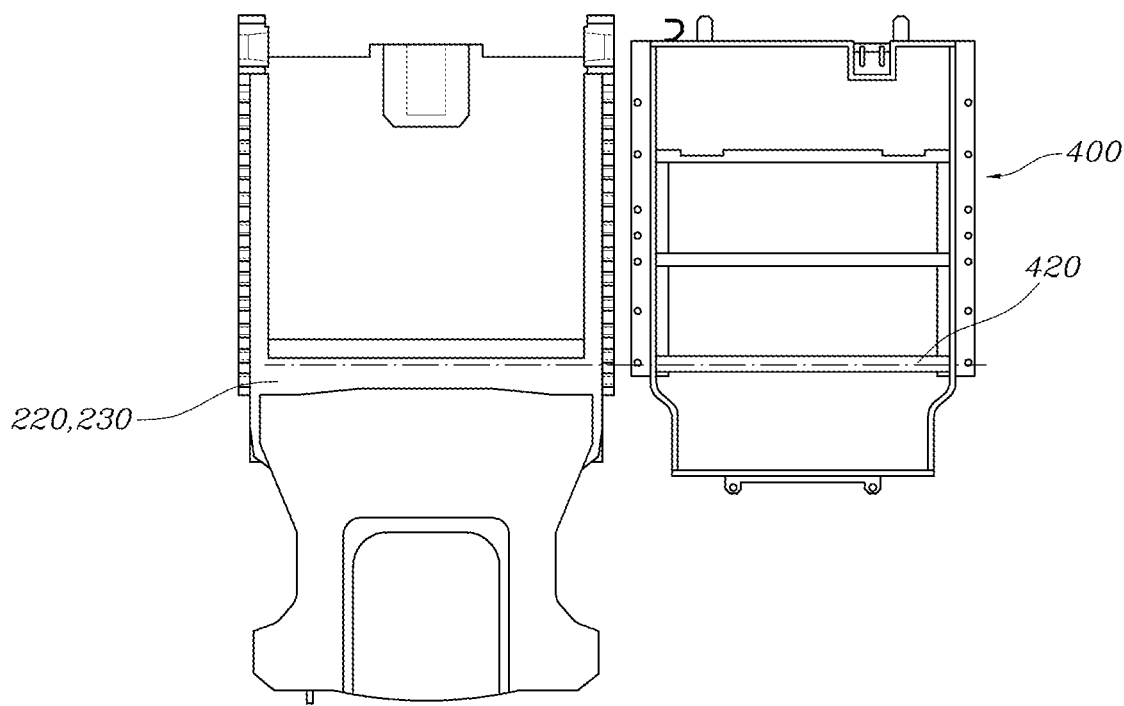
FIG. 11 is a view illustrating the positional relationship between members coupled to portions of the rear floor in the transverse direction and transverse members provided in the battery.

FIG. 11 is a view illustrating the positional relationship between members coupled to portions of the rear floor 30 in the transverse direction and transverse members 420 provided in the battery 400.

Referring to FIG. 11, the transverse members 420 of the battery 400 are coupled in the transverse direction between both side surfaces of the battery 400. The transverse members 420, the rear floor extension 220, and the rear floor cross member 230 may be positioned so as to overlap each other in the top-bottom direction.

For example, the transverse members 420 are coupled to each other in the transverse direction of the battery 400. Rows of the transverse members 420 are arranged side by side in the longitudinal direction and are coupled to both side edges of the battery 400.

In particular, the located rearmost ones of the transverse members 420 of the transverse members 420 are located at the same coordinates (i.e. the same positions in a plan view) as the rear floor cross member 230 and the rear floor extension 220.

That is, the rear floor cross member 230 and the rear floor extension 220 are coupled to the side-seal rear panels 210, the battery 400 is coupled to the side-seal rear panels 210, and the transverse members 420 are coupled to the side portions (i.e. the right and left portions) of the battery 400, such that each of the rows of the transverse members 420 may act as a large single transverse member. This configuration may reinforce transverse strength of the battery 400, thereby effectively protecting the battery 400 in a side collision.

Figure 12:
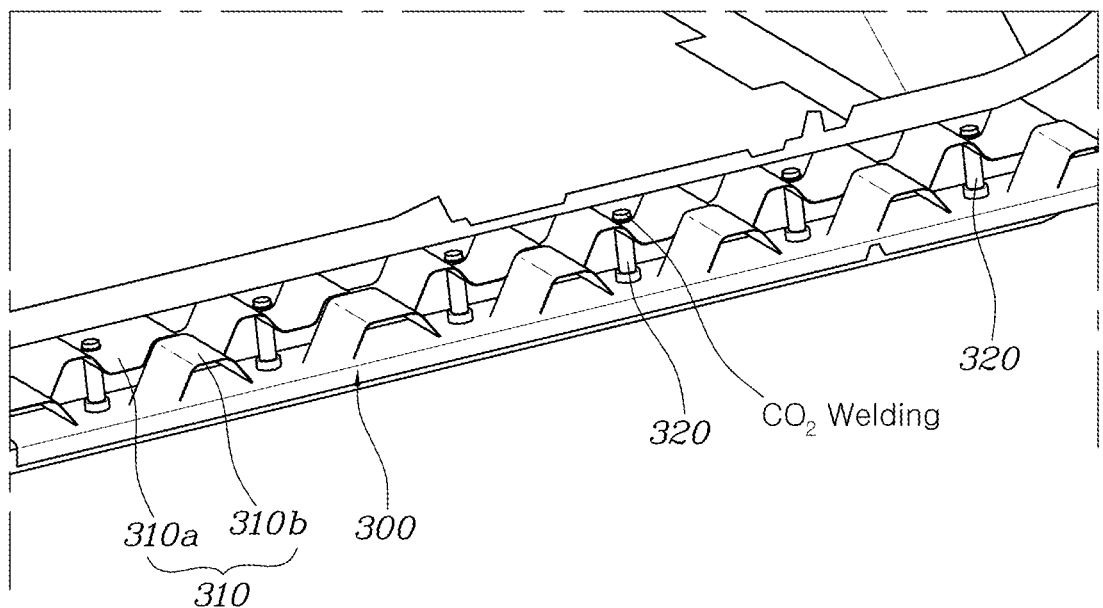
FIG. 12 is a view illustrating a shape in which the side complexes according to the present disclosure are coupled to inner portions of the side-seal panels.

FIG. 12 is a view illustrating a shape in which the side complexes 300 according to the present disclosure are coupled to inner portions of the side-seal panels.

Referring to FIG. 12, each of the side complexes 300 includes reinforcing panels 310 respectively having a convex-concave structure and extending in the longitudinal direction along the side-seal front panels 120 and the side-seal rear panels 210 coupled to the both side portions of the center floor 20. Each of the side complexes 300 is provided by stacking and fixing the reinforcing panels 310 to each other in the top-bottom direction.

For example, an upper reinforcing panel 310a may be fixed to and stacked on top of a lower reinforcing panel 310b, thereby forming a double-layer structure. The upper reinforcing panel 310a and the lower reinforcing panel 310b may be stacked to each other, with the concave portions of the lower reinforcing panel 310b being in surface contact with the convex portions of the lower reinforcing panel 310b. The portions of the upper reinforcing panel 310a and the portions of the lower reinforcing panel 310b in surface contact are welded to each other.

In addition, the distances between the concaves and convexes of the upper reinforcing panel 310a may be the same as the distances between the concaves and convexes of the lower reinforcing panel 310b, but the distances between the concaves and convexes of the upper reinforcing panel 310a may be smaller than the distances between the concaves and convexes of the lower reinforcing panel 310b.

Figure 13:
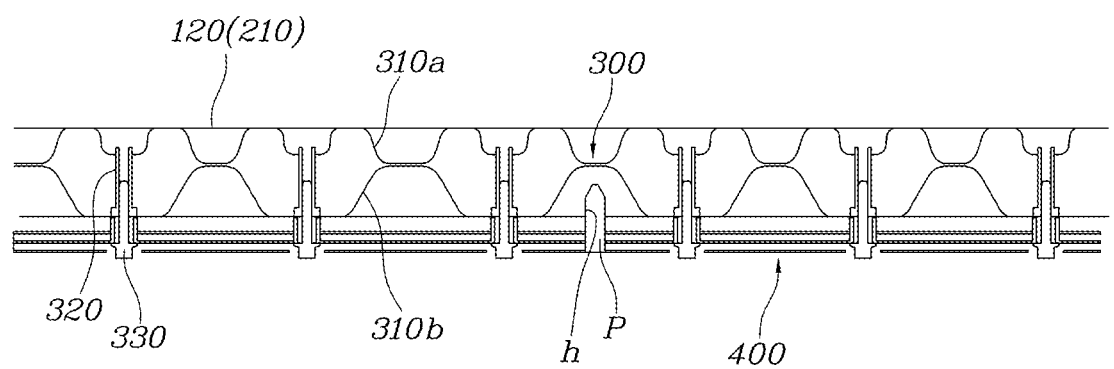
FIG. 13 is a view illustrating a coupling structure of the side complexes and the battery.

FIG. 13 is a view illustrating a coupling structure of the side complexes 300 and the battery 400. First fasteners 320 extend through the reinforcing panels 310, the side-seal front panel, and the bottom surface of the side-seal rear panel. Second fasteners 330 extend through the peripheral portion of the battery 400 to engage with the first fasteners 320.

For example, the first fasteners 320 are cylindrical nut-shaped structures made of a steel material, with the bottom ends thereof extend through the lower reinforcing panel 310b, the side front panel, and the bottom surface of the side rear panel, the top ends thereof extending through the upper reinforcing panel 310a.

In addition, the second fasteners 330 may be bolts that can be fastened to the nut-shaped structures. The second fasteners 330 may extend through the peripheral portion of the battery 400 and engage with the internal portions of the first fasteners 320 in a bolt-fastening manner.

For reference, the second fasteners 330 may be provided in the central portion of the battery 400 so as to be coupled to the center floor 20, thereby more firmly coupling the battery 400 to the vehicle body structure.

In addition, the first fasteners 320 are welded to the upper reinforcing panel 310a among the stacked reinforcing panels 310.

As described above, the distances between the concaves and convexes of the upper reinforcing panel 310a may be smaller than the distances between the concaves and convexes of the lower reinforcing panel 310b. Thus, the first fasteners 320 extend through the upper reinforcing panel 310a such that the top ends thereof are located in the concaves of the upper reinforcing panel 310a. $CO_2$ welding is performed on the peripheral portions of the portions of the first fasteners 320, protruding from the reinforcing panel 310a, thereby welding the first fasteners 320 to the reinforcing panels 310.

Accordingly, the movement of the first fasteners 320 is strongly restrained, thereby improving the fastening strength of mounting portions of the battery 400.

In addition, as illustrated in FIG. 13, guide holes h are formed in the side-seal front panels 120 and the side-seal rear panels 210 coupled to both side portions of the center floor 20, and guide pins p are provided on the peripheral portions of the battery 400. The guide pins p are fitted into the guide holes h.

That is, fitting the guide pins p provided on the battery 400 into the guide holes h enables the battery 400 to be guided to and arranged in a predetermined fastening position before the battery 400 is mounted. Consequently, an operation of mounting the battery 400 may be simplified.

Figure 14:
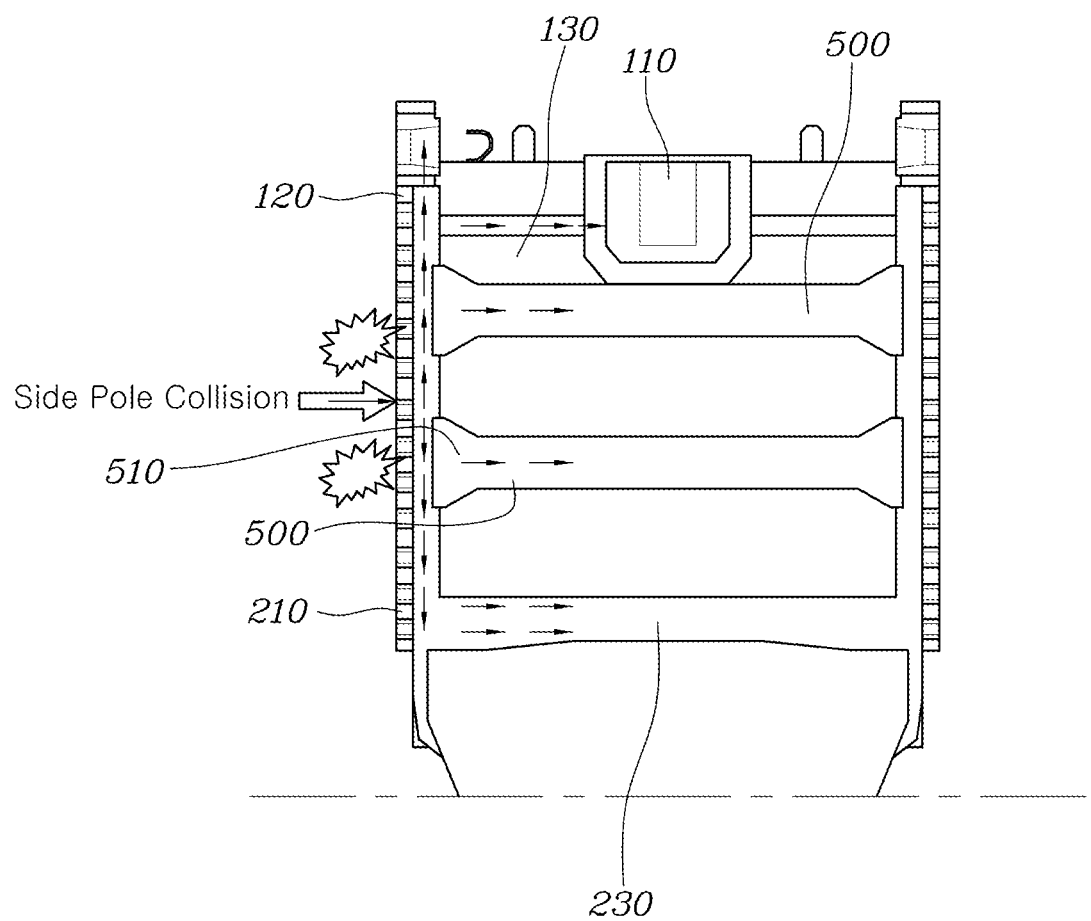
FIGS. 14 and 15 are views illustrating an operation in which a collision load is distributed when a side fall collision occurs on the vehicle body structure to which the present disclosure is applied.
Figure 15:
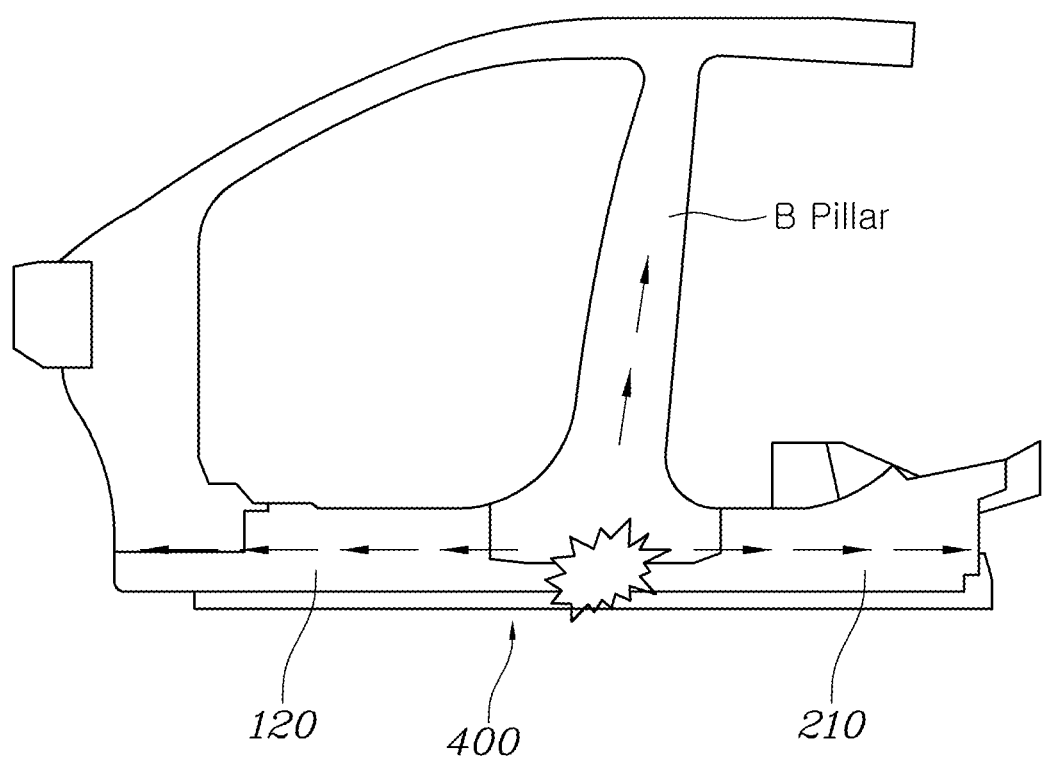

FIGS. 14 and 15 are views illustrating an operation in which a collision load is distributed when a side fall collision occurs on the vehicle body structure to which the present disclosure is applied.

Referring to FIG. 14, seat cross members 500 to be seated and supported on a seat are coupled in the transverse direction between the front end and the rear end of the center floor 20. The seat cross members 500 are connected to the side-seal panels coupled to the both side portions of the center floor 20.

In addition, reinforcing members 510 are connected to the seat cross members 500 and the side-seal panels. The reinforcing members 510 may have a shape extending toward the side-seal panels.

That is, in a side collision of a vehicle, a collision load may be distributed in the longitudinal direction along the side-seal panels and the side complexes 300 within the side-seal panels.

The collision load, distributed as described above, is distributed in the transverse direction through the center floor cross members 130 coupled to the front ends of the side-seal panels and the rear floor cross member 230 and the rear floor extension 220 coupled to the rear ends of the side-seal panels while being distributed in the transverse direction through the reinforcing members 510 and the seat cross members 500.

Accordingly, a collision load applied to the side surface of the vehicle may be distributed to a plurality of portions so as to reduce the burden of the load applied to the B pillar and reduce the burden of the load applied to the battery 400. Accordingly, the present disclosure may inhibit the battery 400 from being fractured or damaged, thereby safely protecting the battery 400.

Although the specific forms of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A vehicle body structure comprising:
    a battery mounted on bottom portions of a center floor and a rear floor; and
    a protective structure having a bottom portion on which a peripheral portion of the battery is mounted, and comprising panels fitted to each other into a shape covering a peripheral portion of the center floor,
    wherein the protective structure further comprises:
        a front complex coupled to, while covering, a front end of the center floor and a portion of a first side surface and a second side surface of the center floor;
        a rear complex coupled to, while covering, a rear end of the center floor and remaining portions of the first and second side surfaces of the center floor; and
        side complexes respectively located on a first side and a second side of the center floor and coupled to an inner portion of the rear complex,
    wherein each of the side complexes comprises:
        reinforcing panels having a convex-concave structure, and extending in a longitudinal direction along side-seal front panels and side-seal rear panels that are coupled to the first and second sides of the center floor, and
    wherein each of the side complexes is provided by stacking and fixing the reinforcing panels in a top-bottom direction.

2. The vehicle body structure of claim 1, wherein the front complex comprises:
    a center floor cover panel configured in a shape covering a power relay of the battery;
    side-seal front panels coupled to front ends of the first and second side surfaces of the center floor in the longitudinal direction; and
    center floor cross members coupled between the cover panel and the side-seal front panels in a transverse direction.

3. The vehicle body structure of claim 2, wherein the center floor cover panel has a first side portion and a second side portion that are coupled to the center floor cross members and a central portion thereof that protrudes upward while covering the power relay.

4. The vehicle body structure of claim 2, wherein a first end of each center floor cross member and a corresponding side surface of the center floor cover panel are overlapped and joined to each other in the top-bottom direction, and
    a second end of the each center floor cross member is supported and joined to a side surface of a corresponding side-seal front panel.

5. The vehicle body structure of claim 1, wherein the rear complex comprises:
    side-seal rear panels coupled to rear ends of the first and second side surfaces of the center floor and portions of a first and a second side surfaces of a rear floor in the longitudinal direction;
    a rear floor extension coupled to joining portions of the center floor and the rear floor in a transverse direction, wherein both ends of the rear floor extension are fixed to the side-seal rear panels; and
    a rear floor cross member coupled to the rear floor extension and configured in a shape covering the rear floor extension, wherein both ends of the rear floor cross member are fixed to the side-seal rear panels.

6. The vehicle body structure of claim 5, wherein:
    the rear floor extension comprises extension supports extending from the both ends of the rear floor extension and supported on top surfaces of the side-seal rear panels,
    the rear floor cross member comprises cross member supports extending from the both ends of the rear floor cross member and supported on the top surfaces of the side-seal rear panels, and
    the extension supports and the cross member supports are joined to the top surfaces of the side-seal rear panels while overlapping each other.

7. The vehicle body structure of claim 5, wherein the battery comprises transverse members coupled in the transverse direction between a first and a second side surfaces of the battery,
    wherein the transverse members, the rear floor extension, and the rear floor cross member overlap each other in the top-bottom direction.

8. The vehicle body structure of claim 1, further comprising:
    first fasteners extending through the reinforcing panels, a side front panel, and a bottom surface of a side rear panel, and
    second fasteners extending through a peripheral portion of the battery and configured to engage with the first fasteners.

9. The vehicle body structure of claim 8, wherein the first fasteners are joined to an upper reinforcing panel of the stacked reinforcing panels.

10. The vehicle body structure of claim 1, wherein the side-seal front panels and the side-seal rear panels coupled to the first and second side surfaces of the center floor have guide holes, and
    the battery has guide pins provided on a peripheral portion thereof, the guide pins configured to be fitted into the guide holes.

11. The vehicle body structure of claim 1, further comprising:
    seat cross members coupled in a transverse direction between the front end and the rear end of the center floor; and
    wherein the seat cross members are connected to the side-seal front and rear panels.

12. The vehicle body structure of claim 11, further comprising:
    reinforcing members configured in a shape extending toward the side-seal front and rear panels, and connected to the seat cross members and the side-seal front and rear panels.

* * * * *